March 6, 1962  J. F. FERRANTE  3,024,393
CAPACITOR CONSTRUCTION

Filed July 21, 1958  3 Sheets-Sheet 1

INVENTOR.
JOSEPH FRANCIS FERRANTE
BY Robert E. Isner
ATTORNEY

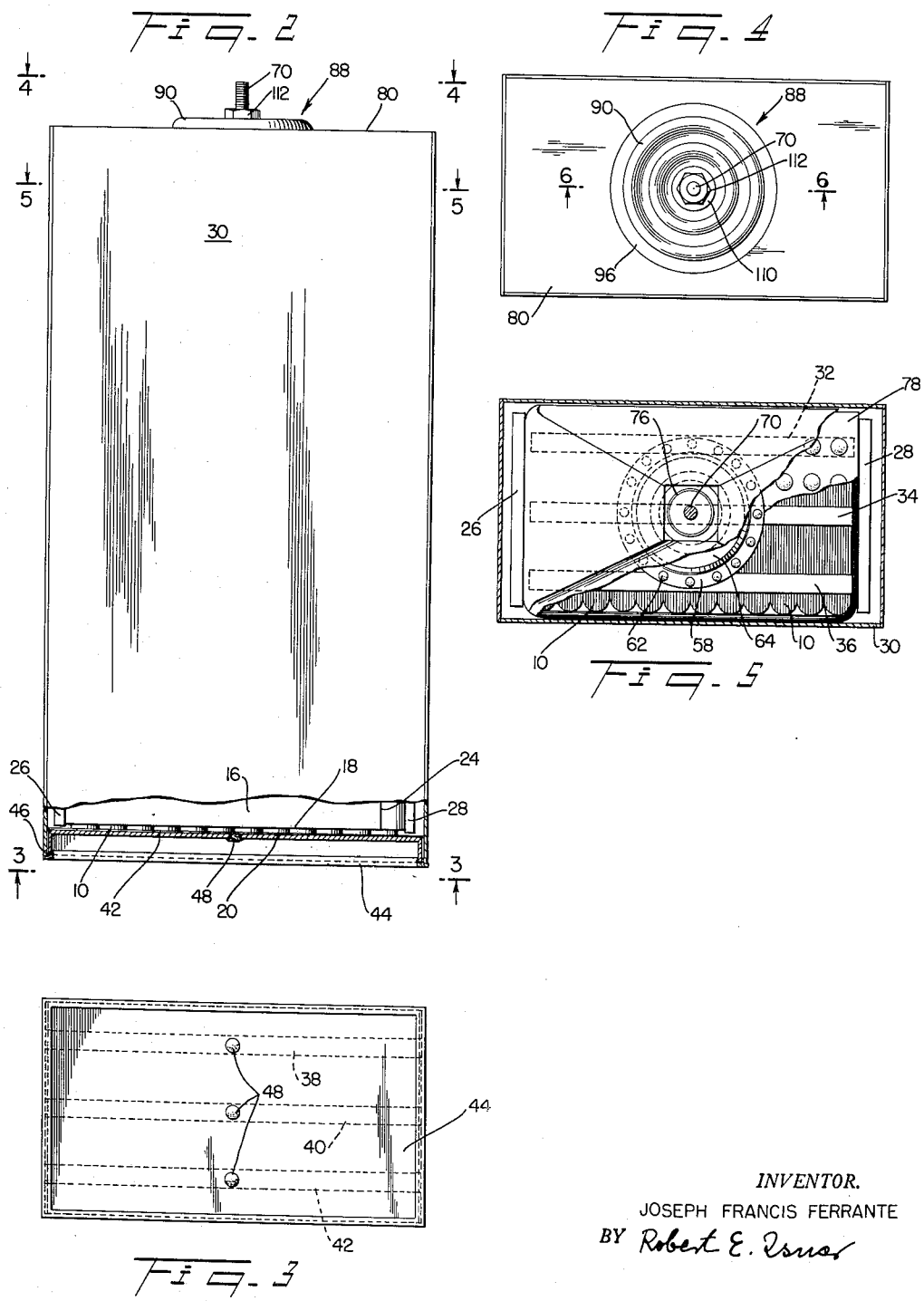

March 6, 1962 J. F. FERRANTE 3,024,393
CAPACITOR CONSTRUCTION
Filed July 21, 1958 3 Sheets-Sheet 3
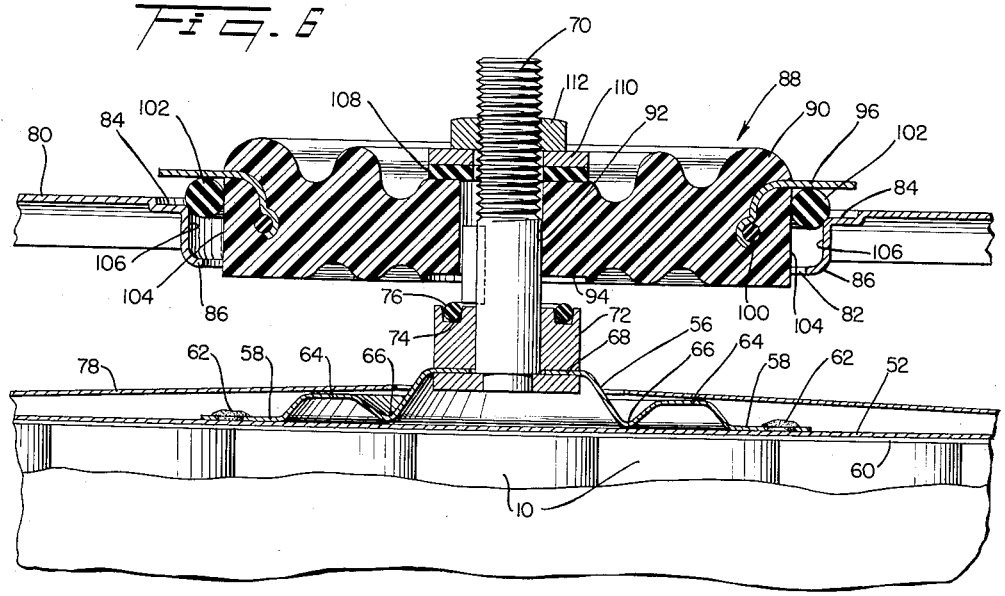
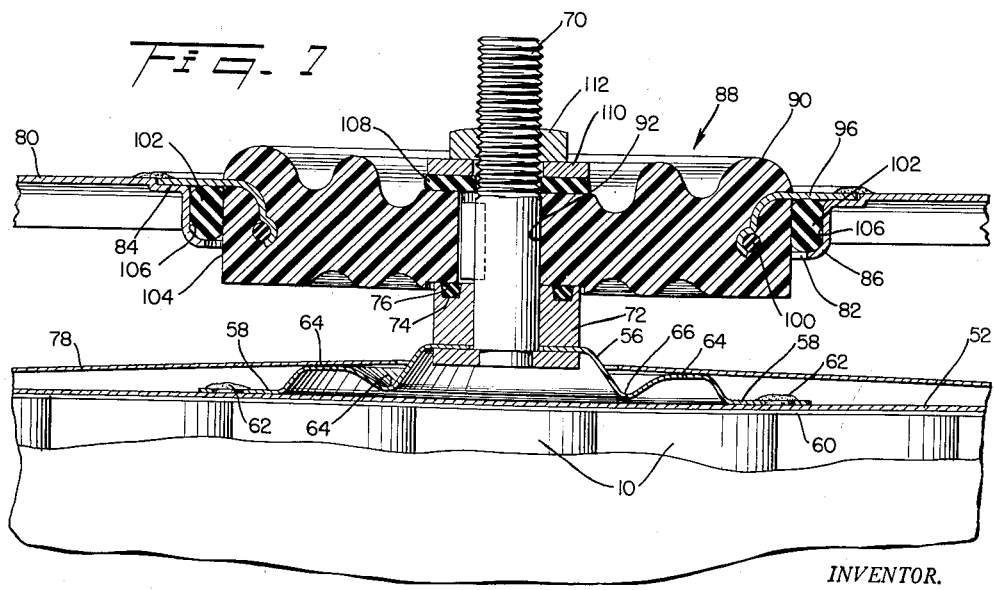
INVENTOR.
JOSEPH FRANCIS FERRANTE
BY Robert E. Isner
ATTORNEY

United States Patent Office 3,024,393
Patented Mar. 6, 1962

3,024,393
CAPACITOR CONSTRUCTION
Joseph Francis Ferrante, Westwood, Mass., assignor, by mesne assignments, to Cornell-Dubilier Electric Corporation, South Plainfield, N.J., a corporation of Delaware
Filed July 21, 1958, Ser. No. 749,897
10 Claims. (Cl. 317—242)

This invention relates to electrical capacitor constructions and particularly to an improved construction for large size low-inductance power capacitors.

Large sized capacitors of the type herein of concern represent a considerable capital investment to the ultimate user thereof. This fact, coupled with the rigorous conditions of use normally attendant operational utilization of such type units, makes it a commercial necessity to provide defect-free units so constructed as to insure, as nearly as possible, extended periods of trouble-free operating life.

A common trouble, in units of the type herein of concern, has been leakage after periods of use. The defects which lead to such leakage are almost impossible to ascertain at the time of fabrication and are usually not evidenced by the usual tests. Such leakage often occurs at or around the capacitor terminal, where, due to the unavoidable utilization of materials of differing physical characteristics, defects appear as a result of the stresses encountered during operational use.

This invention may be briefly described as an improved construction for large-sized capacitors of the general character set forth above which is adapted to simplify the fabrication operations necessary to their manufacture and to more nearly insure the consistent provision of uniformly constructed finished units of improved character capable of greatly extended periods of useful operating life.

The primary object of this invention is the provision of an improved construction for large size, low inductance power capacitors.

Another object of this invention is the provision of an improved terminal construction for large size capacitors.

Other objects and advantages of the invention will be disclosed in the following specification and claims, and will be apparent in the accompanying drawings, which illustrate the principles of the invention and a presently preferred embodiment that incorporates those principles.

Referring to the drawings:

FIGURE 2 is a side elevational view, partially cut away, of a large size capacitor constructed in accordance with principles of the invention.

FIGURE 3 is a plan view of the bottom of a capacitor unit, as viewed from the line 3—3 of FIGURE 2.

FIGURE 4 is a plan view, as viewed from the line 4—4 of FIGURE 2.

FIGURE 5 is a sectional view taken on the line 5—5 of FIGURE 2.

FIGURES 6 and 7 are sectional views, as taken on the line 6—6 of FIGURE 4, showing the details of the terminal construction and its disposition during assembly.

Figure 1:
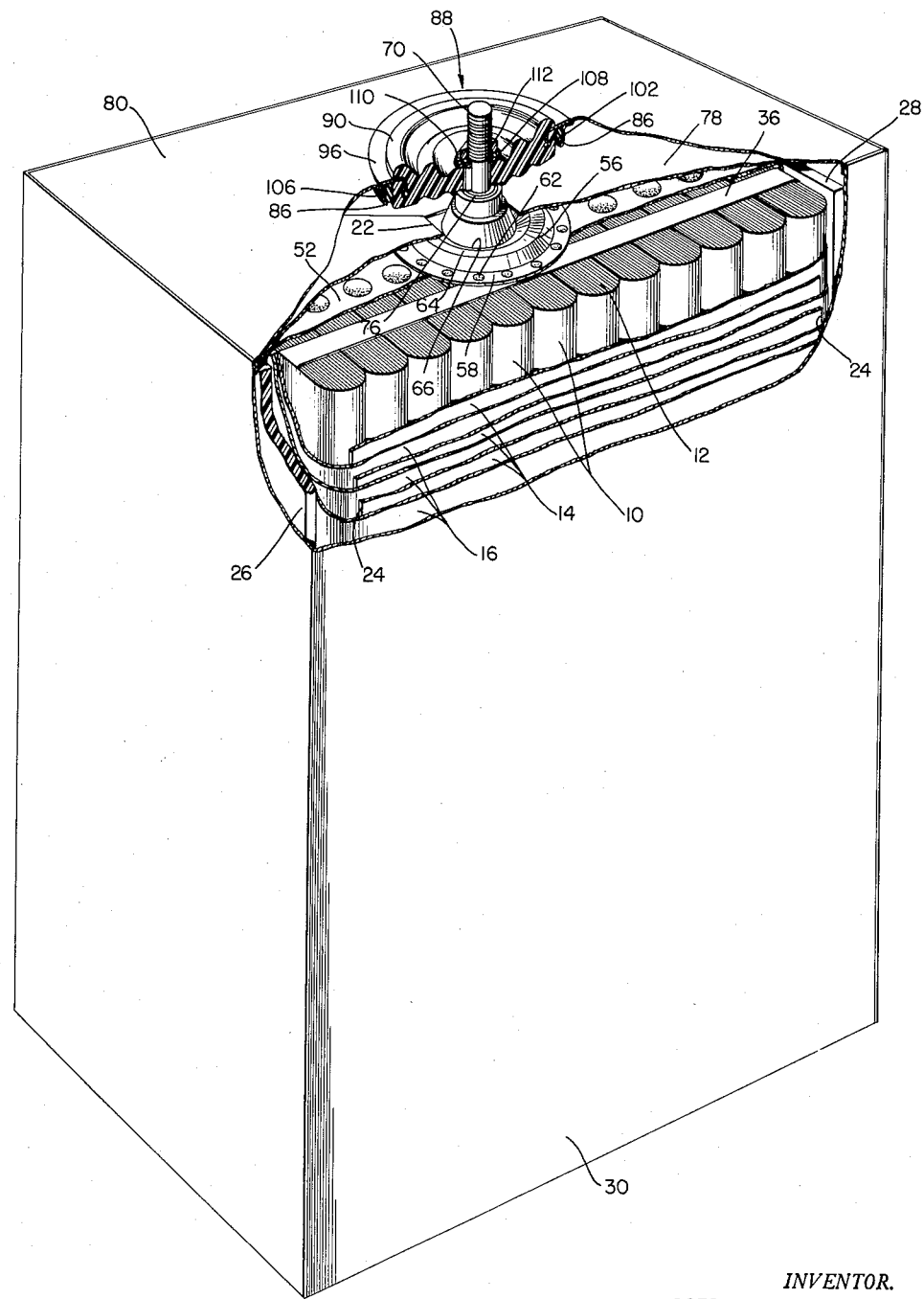
FIGURE 1 is an oblique view, partially cut away, of a large size capacitor constructed in accordance with the principles of this invention.

Referring to the drawings, large size capacitor units of the type herein of concern conventionally include a plurality of relatively large, wound and flattened capacitor sections 10, assembled in aligned side by side relation and pressed into a generally rectangular configuration. The individual capacitor sections 10 are formed of convolutely wound interleaved strips of conducting electrode material, suitably aluminum foil, and dielectric material, suitably paper. In the instant construction, the foil electrode strips are sized and positioned relative to the interleaved dielectric material so as to provide one electrode with an extending edge portion protruding beyond the dielectric at one end of the wound section, as indicated at 12, and the other electrode with an extending edge portion protruding beyond the dielectric at the other end of the wound section.

In the instant construction, a plurality of such wound and flattened capacitor sections 10 are initially assembled in an aligned side by side relationship. The assembled capacitor units 10 are then encased in a plurality of interleaved, alternately disposed U-shaped insulating wrappers 14 and 16. The insulating wrappers are preferably formed of a relatively heavy paper stock and are positioned so that the lower edges thereof are disposed substantially parallel to and even with the bottom of the assembled capacitor sections, as indicated at 20 in FIGURE 2.

The wrappers 14 and 16 are sized so that the upper edges 22 thereof extend a sufficient distance beyond the upper ends of the assembled capacitor sections 10 to permit the hereinafter described folding operation to provide an insulating layer disposed intermediate the cover and the capacitor elements. The wrappers 14 and 16 are additionally sized so that the vertically disposed edges 24 thereof are disposed in interleaved relationship closely adjacent the ends of the assembled capacitor sections 10 when the unit is compressed to its final design size. After encasement of the assembled capacitor sections 10 in the U-shaped wrappers 14 and 16, as described above, rigid insulating compression plates 26 and 28, suitably Bakelite or other insulating material, are placed adjacent the ends of the assembled capacitor sections 10 and the sub-assembly so formed is subjected to a desired degree of compression sufficient to permit insertion of the section 10, wrappers 14 and 16 and plates 26 and 28 into an open-ended metallic casing or container member 30.

After insertion of the sub-assembly as described above into a metallic container 30, a plurality of relatively rigid conducting terminal straps, such as indicated at 32, 34 and 36 in FIGURE 5, are placed in overlaying spaced relation with the protruding foil edges on the top of the assembled capacitor sections 10 and are swaged or soldered, or otherwise secured in a firm mechanical and electrical contact thereto. The terminal straps 32, 34, 36 should be of a length substantially equal to that of the assembled compressed sections 10 so as to provide the desired electrical connection with the protruding foils of all the sections 10 included therein. In a similar manner, a plurality of conducting terminal straps, such as indicated at 38, 40 and 42 in FIGURE 3, are placed in overlaying spaced relation with the protruding foil edges on the bottom of the assembled capacitor section 10 and are swaged or soldered or otherwise secured in firm mechanical and electrical contact thereto. As shown in the drawings, the terminal straps 38, 40 and 42 are of such length and flexibility as to extend a sufficient distance beyond the ends of the assembled capacitor sections 10 so as to permit the disposition of their end portions in compressed relationship intermediate the lower end of the container wall 30 and the abutting side wall portions of the insertable bottom cover member 44, as indicated at 46. With the end portions of the terminal straps 38, 40 and 42 so positioned, the bottom cover member 44 is peripherally welded to the dependent edge of the container 30 to provide a secure air-tight and leak-proof joint therebetween and to provide a secure mechanical and electrical connection between the straps and the container 30.

As best shown in FIGURES 2 and 3, the bottom cover member 44 is also provided with a plurality of apertures 48 so located as to be disposed in overlaying relationship with the straps 38, 40 and 42 in the assembled unit. The apertures 48 thus expose the underlying portions of the strap members 38, 40 and 42 and permit the introduction of a solder filling therein to further assure a secure mechanical and electric connection between the outer casing 30 and the straps in an assembled unit and to additionally provide alternate current flow paths to minimize possible inductance effects that might otherwise be produced.

Subsequent to the formation of the bottom portions of the encased unit, as described above, a relatively thin perforated plate member 52, hereinafter designated a termination plate, sized to cover the surface area of the assembled capacitor section 10, is placed in overlaying relationship therewith and in engagement with said terminal strap members 32, 34 and 36. The termination plate 52 is preferably provided with rows of apertures 54, positioned to alignedly overlay the terminal straps 32, 34 and 36 and thereby permit a plurality of swaged or soldered or otherwise firmly secured mechanical and electrical connections therebetween. After securement of the termination plate 52 to the terminal straps 32, 34 and 36 a terminal stud sub-assembly, generally designated 56, is placed upon the upper surface of the plate 52 at a predetermined position thereon, which positioning may be facilitated by the use of a suitable positioning jig.

Referring now particularly to FIGURES 6 and 7, the terminal stud sub-assembly includes a circularly shaped base plate member having an annular flat peripheral portion 58 the underside of which is adapted to be disposed in abutting relationship with the upper surface of the termination plate 52. As shown in the drawings (FIGURES 1 and 5), the peripheral portion 58 of the base plate member is preferably provided with a plurality of apertures 60 therein to permit a multiplicity of swaged, soldered or other secure mechanical and electrical connections between said peripheral portion 58 and the termination plate 52, as indicated at 62 in FIGURES 6 and 7. Inwardly disposed from the annular peripheral and concentric therewith is an integral raised annularly shaped intermediate portion 64. The intermediate portion 64 inwardly terminates in an integral, concentric, depressed flexing ring portion 66 which, in turn, inwardly merges with a centrally disposed elevated center or hub section 68. Axially mounted on the center section 68 and extending upwardly therefrom is a threaded and keyed terminal stud member 70. Also mounted on the center section 68 and disposed in surrounding relationship with the lower portion of the stud member 70 is a spacing sleeve member 72. This spacing sleeve member 72 is provided with an annular recess 74 disposed on the upper surface thereof adjacent its periphery and sized to contain a deformable sealing ring such as an O-ring 76.

The base plate member, as described above, is preferably fabricated of relatively soft tinned copper and should be of such character as to permit deformation of the flexing ring portion 66 whenever the peripheral portion 68 thereof is fixed in position and an upwardly directed force is applied to the stud 70. Such construction thus provides a yieldable terminal stud mounting which permits displacement of the terminal stud 70 during the hereinafter described final assembly operation without any destruction or other detrimental effects to the joint between the peripheral portion 58 thereof and the termination plate 52.

Subsequent to the securement of the terminal stud sub-assembly to the upper surface of the terminal plate 52 as described above, the upwardly extending portions of the wrappers 14 and 16 are package-folded in overlaying relationship with the upper surface of the termination plate 52 and the portions of the terminal stud sub-assembly adjacent the spacing sleeve 72, as indicated at 78. If necessary, portions of the edge of the wrapper members 14 and 16 can be cut back in order to prevent engagement thereby with the spacing sleeve 72. The package-folding of the upwardly extending portions of the wrapper members 14 and 16, as described above, provides multiple layers of insulating material disposed intermediate the upper surface of the termination plate 52 and a top cover member 80 for the container 30 which is then placed thereover and welded or otherwise peripherally secured in airtight and liquid relationship to said container 30.

The top cover member 80 is provided with a centrally disposed circularly-shaped bushing receiving aperture 82 so located as to be disposed concentric with the stud member 70. The cover member 80 is shaped to provide in the portions thereof surrounding the aperture 82 an annularly shaped recessed flange receiving shoulder 84, a vertically disposed horizontal wall portion 106 and a dependant horizontally disposed inwardly directed peripheral ledge or rim portion 86. Adapted to be received within the aperture 82 is an insulating bushing assembly, generally designated 88. The bushing assembly 88 includes a disc-shaped bushing member 90 formed of suitable insulating material, preferably an epoxy resin, having a corrugated upper and lower surface and an axially disposed bore and keyway 92 sized to receive the keyed terminal stud 70. The bushing 90 is provided with a plane surfaced annular recessed shoulder portion 94 on the under surface thereof surrounding said bore which is sized to contain the upper surface of the spacing stem sleeve 72 and to provide a sealing surface to engage the extending portion of the sealing ring 76 in the assembled unit. The bushing member 90 is also provided with an integral horizontally disposed extending peripheral flange 96, sized to be received within the aforementioned shoulder 84 in the cover member 80. The flange 96 is preferably formed of metal and the end thereof embedded within the body of the bushing member 90 is deformed to provide a mounting recess 98 sized to tightly contain a silicone rubber O-ring 100. The flange 96 and O-ring 100 mounted in the recess 98 are formed so as to be integral with the bushing member 90 as by molding the bushing member 90 thereabout during its fabrication operation to form an air and liquid tight joint therebetween. The integral inclusion of the flange and the internally disposed O-ring 100 effectively minimizes, if not actually eliminates, the possibility of leakage occurring at the abutting surfaces of the metal flange 96 and surrounding resin due to possible separation thereof under operating conditions resulting from the varying thermal expansion characteristics of the materials involved.

After welded securement of the cover member 80 to the container 30, as described above, a deformable O-ring 102 is placed below the flange 96 adjacent the peripheral surface 104 of the bushing 90. The bushing assembly 88 is placed on the stud 70, as generally indicated in FIG. 6, and an insulating washer 108, a metal washer 110 and the threaded nut 112 are placed in operating relation therewith. Downward pressure is then applied to the surface of the bushing 90 to downwardly displace the same relation to the cover member 80. The downward displacement of the bushing assembly 88 results in introduction of the O-ring 102 into the annular space disposed intermediate the peripheral wall 104 of the bushing member 90 and the vertically disposed wall portion 106 of the cover member 80 and in consequent deformation thereof into sealing engagement therewith. The downward displacement of the bushing assembly 88 is limited by the disposition of the extending flange 96 within the flange receiving shoulder 84. With the elements so positioned and while maintaining the downward pressure on the bushing member 90 the peripheral flange 96 is swaged or soldered or otherwise mechanically joined to the cover member 80 to provide a secure, airtight and leak-proof joint therebetween and to position the bushing member relative to the cover member. After securement of the bushing assembly as described above, the nut 112 is tightened. The tightening of the nut 112 effects a displacement of the terminal stud 70 and spacing sleeve 72 in relation to the bushing 90 which effectively places the O-ring 76 into deformed sealing engagement with the shoulder 94. As mentioned earlier, the inclusion of the aforementioned flexing ring 66 in the base plate portion of the terminal stud assembly permits displacement of the stud 70 relative to the secured peripheral portion 58 thereof and thus effectively reduces, if not eliminates damage to the joint between the terminal stud assembly and the termination plate 52, which damage heretofore was not readily discernable in prior devices of this general character.

Subsequent thereto, the flange 96 is preferably covered with a resin of the same character as that used for the bushing member 90 to a depth sufficient to render the adjacent surfaces flush with the upper surface of the bushing member 90.

Among the advantages attendant practice of the herein described invention is the permitted fabrication of a greater number of substantially defect-free capacitors of improved character capable of extended periods of trouble-free operating life, as well as the production of a capacitor unit of improved low inductance characteristics.

Having thus described my invention, I claim:

1. A construction for capacitors having a plurality of flattened capacitor sections disposed in aligned compressed relation within a container having an apertured cover member and with each of said capacitor sections having a first electrode element selectively extending from the ends of said sections facing said cover member comprising a plurality of terminal straps disposed across said capacitor sections and metallically secured to said first electrode elements thereof, a plate member overlaying said straps and metallically secured thereto, a terminal stud subassembly mounted on said plate member including a base member peripherally secured thereto, a centrally disposed extending stud member mounted on said base member and sized to extend outwardly through the aperture in said cover member and integral yielding means disposed intermediate the base of said stud member and the periphery of said base member to permit displacement of said stud member relative to the secured peripheral portions of said base member and an insulating bushing member mounted on said terminal stud and disposed in sealing relationship with the aperture in said cover member.

2. The capacitor construction as set forth in claim 1, including a spacing sleeve member surrounding the lower portion of said stud member having an annular recess on the upper surface thereof, deformable means disposed within said recess and means for placing the upper surface of said sleeve member in compressive abutting relation with the underside of said bushing member to deform said deformable means into sealing relationship therebetween.

3. The capacitor construction as set forth in claim 1 including a flange receiving shoulder in said cover member surrounding the aperture therein, a sealing surface disposed adjacent to said shoulder, an extending peripheral flange on said bushing member disposed in compressive abutting relation therewith and deformable means disposed in deformed condition intermediate said sealing surface and the periphery of said bushing member adjacent the underside of said flange to seal the joint therebetween.

4. A terminal stud subassembly for capacitors comprising a conducting base member adapted for peripheral securement to an electrically active element, a centrally disposed conducting terminal stud member having a base portion mechanically secured to said base member and extending outwardly from one surface thereof and integral yielding means included in said base member intermediate the periphery thereof and the point of securement of said base portion of said stud member thereto to permit generally perpendicular displacement of said stud member relative to the periphery of said base member.

5. The terminal stud assembly as set forth in claim 4 wherein said conducting base member is circular in shape, said terminal stud member is axially disposed thereon and said integral yielding means is in the shape of an annular ring disposed concentric with the periphery of said base member.

6. The terminal stud subassembly as set forth in claim 4, including an integral spacing sleeve surrounding the lower portion of said stud member having an annular recess on the upper surface thereof and deformable means disposed in said recess sized to extend, in undeformed condition, beyond the upper surface of said sleeve.

7. The terminal stud subassmbly as set forth in claim 6 including an insulating bushing member mounted on said stud and means for disposing the underside of said bushing member in compressive sealing relationship with said deformable means disposed in said recess in said sleeve member.

8. A capacitor construction as set forth in claim 1 including an insertable container bottom, a second electrode selectively extending from the ends of said capacitor sections disposed remote from said cover member, a plurality of terminal strap members disposed thereacross and metallically secured thereto, said last mentioned strap members being sized so that the portions thereof extending beyond said capacitor sections are disposed intermediate abutting surfaces of said container and container bottom and welding means joining the abutting surfaces of said container and container bottom.

9. The capacitor construction as set forth in claim 8 including a plurality of solder-filled apertures in said container bottom disposed in overlaying relation with said last mentioned terminal straps for electrically connecting said straps to said bottom at locations remote from the ends thereof.

10. The capacitor construction as set forth in claim 1 including a plurality of interleaved U-shaped wrapper members disposed in surrounding relation with said capacitor sections and having the upper portions thereof package folded into overlaying relation on the upper surface of said plate member.

References Cited in the file of this patent

UNITED STATES PATENTS

| | | |
|---|---|---|
| 1,823,368 | Marbury | Sept. 15, 1931 |
| 1,904,805 | Selling | Apr. 18, 1933 |
| 1,920,177 | Bailey | Aug. 1, 1933 |
| 2,523,083 | Witkowski | Sept. 19, 1950 |

FOREIGN PATENTS

| | | |
|---|---|---|
| 915,351 | Germany | July 19, 1954 |